US012611357B2

(12) United States Patent
Li

(10) Patent No.: US 12,611,357 B2
(45) Date of Patent: Apr. 28, 2026

(54) SEXUAL STIMULATION METHOD AND SEXUAL STIMULATION APPARATUS

(71) Applicant: Siran Li, Shenzhen (CN)

(72) Inventor: Siran Li, Shenzhen (CN)

( * ) Notice: Subject to any disclaimer, the term of this patent is extended or adjusted under 35 U.S.C. 154(b) by 1162 days.

(21) Appl. No.: 17/560,224

(22) Filed: Dec. 22, 2021

(65) Prior Publication Data

US 2023/0116280 A1 Apr. 13, 2023

Related U.S. Application Data

(63) Continuation of application No. PCT/CN2021/122821, filed on Oct. 9, 2021.

(51) Int. Cl.
*A61H 19/00* (2006.01)

(52) U.S. Cl.
CPC ..... *A61H 19/30* (2013.01); *A61H 2201/1602* (2013.01); *A61H 2201/1657* (2013.01); *A61H 2201/169* (2013.01); *A61H 2201/5025* (2013.01); *A61H 2201/5033* (2013.01)

(58) Field of Classification Search
CPC ........ A61H 19/30; A61H 19/32; A61H 19/34; A61H 19/40; A61H 19/44; A61H 19/50; G06V 10/82
See application file for complete search history.

(56) References Cited

U.S. PATENT DOCUMENTS

2007/0055096 A1 3/2007 Berry et al.
2015/0335519 A1* 11/2015 Lv .......................... H04W 4/80 700/275
2017/0366858 A1 12/2017 Olivares, II et al.
2020/0093684 A1 3/2020 Sloan
2020/0099970 A1 3/2020 Sloan
2020/0253816 A1* 8/2020 Sloan .................. H04N 21/242
2020/0366972 A1 11/2020 Sloan
2021/0209934 A1* 7/2021 Siles ...................... G06F 9/452

FOREIGN PATENT DOCUMENTS

JP 2006075422 A 3/2006
TW 201735892 A 10/2017

OTHER PUBLICATIONS

European Search Report, European Application No. 21823475.5, mailed Nov. 12, 2024 (7 pages).
Japanese Notice of Reasons for Refusal, Japanese Patent Application No. 2023-577487, mailed Aug. 27, 2024(8 pages).
International search report, International Application No. PCT/CN2021/122821, mailed Jun. 24, 2022 (5 pages).
Written Opinion of the International Search Authority, International Application No. PCT/CN2021/122821, mailed Jun. 24, 2022 (5 pages).

* cited by examiner

*Primary Examiner* — Carrie R Dorna

(57) ABSTRACT

Disclosed are a sexual stimulation method and a sexual stimulation apparatus. The method includes obtaining a video segment, wherein the video segment includes a sexual stimulation scenario; parsing the video segment and generating a chronological sexual stimulation parameter set corresponding to the video segment; and playing, by a video play device, the video segment; and synchronously performing, by a sexual stimulation apparatus, a multi-dimensional stimulation operation according to the chronological sexual stimulation parameter set.

23 Claims, 6 Drawing Sheets

SEXUAL STIMULATION METHOD AND SEXUAL STIMULATION APPARATUS

CROSS REFERENCE

The present application is a continuation-application of International (PCT) Patent Application No. PCT/CN2021/122821, filed on Oct. 9, 2021, the entire contents of which are hereby incorporated by reference in its entirety.

TECHNICAL FIELD

The present disclosure relates to the field of sexual massage technologies, and in particular to a sexual stimulation method and a sexual stimulation apparatus.

BACKGROUND

With the development of society and the accelerated pace of life, the mental pressure of modern people is getting bigger. How to relieve stress has become an increasingly important topic, and an increasing variety of sexual dysfunctions have become an important factor affecting people's quality of life. Masturbation has been medically proven to be effective in releasing sexual stress, relaxing mind and body, promoting health, and be a preferable option for single people or those with disabilities. People often use sexual stimulation apparatuses and watch adult videos while masturbating. However, the existing sexual stimulation apparatuses cannot match with the adult videos synchronously, such that the users have to operate the sexual stimulation apparatus while watching the video and will be distracted. In addition, although some of the sexual stimulation apparatuses may operate automatically, the operation of the sexual stimulation apparatuses is irrelevant to the adult video the user is watching. All of these affect the user's experience and reduce the pleasure obtained by the user.

SUMMARY OF THE DISCLOSURE

The purpose of the present disclosure is to address the challenge of the lack of effective synchronization between sexual stimulation apparatuses and adult videos.

To solve the above technical problems, in a first aspect, the present disclosure provides a sexual stimulation method, comprising: obtaining a video segment, wherein the video segment comprises a sexual stimulation scenario; parsing the video segment and generating a chronological sexual stimulation parameter set corresponding to the video segment; and playing, by a video play device, the video segment; and synchronously performing, by a sexual stimulation apparatus, a multi-dimensional stimulation operation according to the chronological sexual stimulation parameter set.

In a second aspect, the present disclosure provides a sexual stimulation apparatus, comprising: a communication module, configured to communicate with a video play device and/or a server, and to receive a chronological sexual stimulation parameter set or control signals sent from the video play device or the server; wherein the chronological sexual stimulation parameter is generated by parsing a video segment comprising a sexual stimulation scenario through the video play device or the server, the control signal is generated based on the chronological sexual stimulation parameter set; while the video play device plays the video segment, the sexual stimulation apparatus synchronously performs a multi-dimensional stimulation operation according to the control signals.

In a third aspect, the present disclosure provides a sexual stimulation apparatus, comprising: a communication module, configured to communicate with a video play device and/or a server to receive a video segment; wherein the video segment comprises a sexual stimulation scenario; a memory, configured to store a program; and a processor, configured to call the program stored in the memory and implement: parsing the video segment to generate a chronological sexual stimulation parameter set corresponding to the video segment, and generating control signals according to the chronological sexual stimulation parameter; and synchronously performing a multi-dimensional stimulation operation according to the control signals while the video segment is played on the video play device.

In the above manner, the present disclosure enables the interaction between the sexual stimulation apparatus and the video segment, increasing the sensory dimension of the user's experience of the video and enhancing the pleasure obtained by the user through the sexual stimulation apparatus.

BRIEF DESCRIPTION OF THE DRAWINGS

Embodiments of the present disclosure have other advantages and features that will be more readily apparent from the specific embodiments and appended claims stated below when combined with the accompanying drawings.

Figure 1:
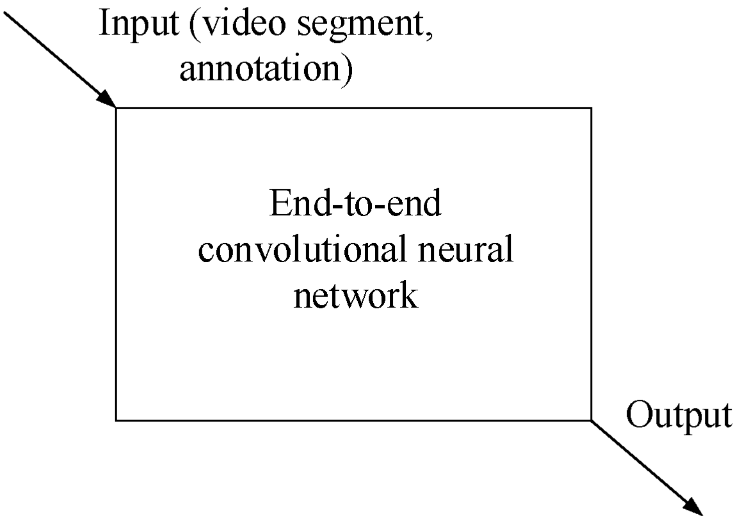
FIG. 1 is a schematic view of training an end-to-end convolutional neural network according to an embodiment of the present disclosure.

The accompanying drawings depict various embodiments for illustrative purposes only. Those skilled in the art will readily recognize from the following discussion that alternative embodiments of the structures and methods illustrated herein may be employed without departing from the principles described herein.

DETAILED DESCRIPTION

Embodiments of the present disclosure are described in detail below, and examples of the embodiments are shown in the accompanying drawings, wherein same or similar designations indicate same or similar components or components having same or similar functions. The embodiments described below by reference to the accompanying drawings are exemplary, intended to explain the present disclosure and are not to be construed as limiting the present disclosure.

I. Sexual Stimulation Apparatus

The sexual stimulation apparatus of the present disclosure may also be called as an erotic product, including male sexual stimulation apparatus used by men and female sexual stimulation apparatus used by women. The sexual stimulation apparatus includes, but is not limited to, what may be commonly referred to as, male masturbator, female vibrator, sex doll, sex robot, nipple stimulator, oral sex stimulator, etc. The sexual stimulation apparatus may be configured to apply sexual stimulation to a human body, for generating corresponding sexual pleasure and/or sexual satisfaction in the user. The sexual stimulation apparatus may include actuating components such as an electric motor, a hydraulic motor, an electrostrictive member (e.g., an electrostrictive component made of electro-active polymeric material, etc.), etc., to drive other components of the sexual stimulation apparatuses, for producing corresponding actions to apply sexual stimulation on the user.

II. Video Processing Software

The video processing software of the present disclosure may refer to various types of applications capable of analyzing and processing video, extracting video features, and generating corresponding sexual stimulation feature parameters, which may also be called as a video processing model. In practice, the video processing software of the present disclosure may consist of several neural networks and several video processing-specific programs, of which main function is to output a chronological sexual stimulation parameter set after inputting a video segment such that the sexual stimulation apparatus can perform the corresponding sexual stimulation operation.

In some embodiments, the sexual stimulation apparatus of the present disclosure can perform a multi-dimensional stimulation operation, such as a sexual stimulation operation of at least one human body part in an axial direction, a sexual stimulation operation of at least one human body part in a radial direction, and/or a sexual stimulation operation of at least one human body part in a circumferential direction. Of course, it will be understood by those skilled in the art that the multi-dimensional sexual stimulation operation performed by the sexual stimulation apparatus of the present disclosure may also include sexual stimulation in other dimensions, such as, a sexual stimulation of temperature of at least one human body part, a sexual stimulation of humidity of at least one human body part, and/or a sexual stimulation of lubricity of at least one human body part, etc.

Correspondingly, in the present disclosure, the chronological sexual stimulation parameter set output by the video processing software is a multi-dimensional chronological sexual stimulation parameter set, including a sexual stimulation parameter of at least one human body part in the axial direction, a sexual stimulation parameter of at least one human body part in the radial direction, and/or a sexual stimulation parameter of at least one human body part in the circumferential direction. Of course, it will be understood by those skilled in the art that the multi-dimensional chronological sexual stimulation parameter set output by the video processing software of the present disclosure may also include sexual stimulation parameters in other dimensions, such as, a sexual stimulation parameter of temperature of at least one human body part, a sexual stimulation parameter of humidity of at least one human body part, and/or a sexual stimulation parameter of lubricity of at least one human body part, etc.

In some embodiments, the video processing software of the present disclosure may be a single video processing model with end-to-end machine learning capability, for example, a neural network model. As will be explained in detail below, the present disclosure applies a single end-to-end machine-learning video processing model, in particular a convolutional neural network video processing software, to parse the video segment to generate the chronological sexual stimulation parameter set corresponding to the video segment. Of course, it will be understood by those skilled in the art that the video processing software of the present disclosure may also be a single video processing model in another type, such as, a specialized program for analyzing and processing video, which is capable of analyzing and processing sexual stimulation scenarios in the video segment and generating the chronological sexual stimulation parameter set corresponding to the video segment.

The video segment may include video data and sound data encapsulated together. The video segment may be, for example, a recorded video or a part thereof, which is not limited herein. The video segment may also be, for example, an animated film or a video generated in some other way.

1. Training of Video Processing Software

A training method of the machine-learning model applied in the present disclosure is now illustrated using an end-to-end convolutional neural network as an example. The present disclosure may also adopt a machine-learning model trained with other methods, which is not limited herein.

Referring to FIG. 1, FIG. 1 is a schematic view of training an end-to-end convolutional neural network according to an embodiment of the present disclosure.

When training an end-to-end convolutional neural network, training data is a pair consisting of a video segment and an annotation, where the annotation must conform to the format of the chronological sexual stimulation parameter set. That is, the content of the annotation is the chronological sexual stimulation parameter set that the convolutional neural network should be expected to output. The format of the annotated chronological sexual stimulation parameter set may be modularly adapted according to expectations of the output of the video processing software. One of the available formats that conforms to the multi-dimensional chronological sexual stimulation parameter set, is shown below.

| Timestamp | Axial action of human body part | Radial action of human body part | Circumferential action of human body part |
|---|---|---|---|
| TS | p1 | p2 | p3 |

A video segment may include sexual stimulation scenarios. The sexual stimulation scenarios may include sex scenarios and/or seduction scenarios, etc. The seduction scenarios may be mostly seen in pole dancing, Korean female group dancing, striptease, etc. In the seduction scenarios, a sexual stimulation effect may be produced when a performer makes teasing and seducing actions such as buttocks, butt twisting, tongue spitting, etc.

The video segment may be a three-dimensional (3D) video segment or a two-dimensional (2D) video segment, which is not limited herein. The video segment may include publicly available video segments obtained from the Internet, video segments from commercially available databases, video segments recorded by users themselves, etc.

The annotation may be performed in a purely manual way or in a semi-procedural and semi-manual way. In practical applications, both of the two ways may be used for annotation. The annotation shall accurately express the correspondence between the video segment and the multi-dimensional chronological sexual stimulation parameter set, which mainly requires temporal synchronization and accuracy of relative position.

The training data may be divided into a training set and a test set. When training the neural network, the video segment and annotation are fed into the neural network such that the neural network learns how to output the chronological sexual stimulation parameter set in an annotated manner.

The trained neural network is tested with the test set. When testing the neural network, the neural network parses the video segment to obtain a prediction result. The prediction result is compared with a real result (i.e., the annotation of the video segment in the test set) to obtain a loss of the video processing software. Parameters of the neural network being trained are adjusted by back propagation of the loss. When a test result of the neural network meets expectations, the training of the neural network is completed. When the test result of the neural network fails to meet expectations, the training set may be replaced or adjusted and the neural network may be retrained.

In general, the more training data, the better the robustness and accuracy of the resulting video processing software neural network will be, as far as time, money, computing power, and other resources allow. After obtaining the training data, the training data may be divided into a training set and a test set. The training set is configured to perform machine learning and the test set is configured to test the accuracy of the neural network. In some embodiments, a part of the training data may be divided into a cross-validation set for cross-validation. The cross-validation is well known to the art and will not be repeated herein.

In practice, the video processing software of the present disclosure may not be only adopted with the single end-to-end neural network, but may be adopted with multiple neural networks with different purposes and multiple video processing-specific programs. Therefore, the video segment used as the training data is required to be annotated with a variety of information to train the video processing software of the present disclosure. For a same video segment, the information to be annotated may include information about a human body part or other objects, texture information, information about whether a sexual play event occurs, the type of the sexual play event, the speed of an action in the sexual play event, the direction of the action, the temperature of the human body part, the humidity of the human body part, sound information, etc. The human body part includes, but is not limited to: the limbs, trunk, and mouth of the human body part. The human body part includes, but is not limited to, male and female sexual organs, breasts, sexually sensitive areas, etc. The other objects include but are not limited to: a bed, a condom, a sexual stimulation apparatus, etc. The texture information includes, but is not limited to, the skin color of the human body, facial expressions, etc. The type of the sexual play event includes but is not limited to: oral sex, anal sex, vaginal intercourse, breast sex, foot sex, etc. The type of the sexual play event also includes specific sexual positions, the number of people involved in the sexual activity, etc. The sound information includes sound frequency, sound loudness, timbre, frequency domain distribution, sound semantics, the type of action characterized by the sound, the degree of emotion characterized by the sound, etc.

2. Other Features of the Video Processing Software

The video processing software may include a video pre-processing module. The video pre-processing module may be configured to pre-process an input video, including but not limited to de-multiplexing the video segment, decoding the video segment, adjusting the resolution of the video segment, adjusting the brightness of the video segment, and sampling the video segment. The video segment has a certain frame rate. Each frame of the video segment is a still image, and displaying frames in rapid succession creates an animated video. Therefore, the higher the frame rate, the smoother and more realistic the video will be. In the present disclosure, it is not necessary for the video processing module to process every frame of image (also referred to as image frame in the following). The video pre-processing module may sample some frames from the video segment at a certain interval for the video processing software to parse. For example, when the frame rate of the video is 60 frames per second, the video pre-processing module may sample one frame out of every three of the 60 frames (i.e., 20 frames per second) as samples for processing. The samples include image samples and sound samples. The present disclosure does not limit the sampling frequency of the video pre-processing module.

In some embodiments, the sampling frequency of the image samples and the sound samples may not be the same. For example, the sampling frequency of the sound samples may be greater than the sampling frequency of the image samples.

In some embodiments, the video processing software may also include an image processing module and a sound processing module to process the image samples and the sound samples in the video segment, respectively.

In some embodiments, the image processing module is an image processing neural network using a 3D convolutional neural network. The 3D convolutional neural network may capture spatial information along with chronological information, facilitating the capture of the sexual action information needed for the video processing of the present disclosure. For example, a 3D convolutional kernel of the 3D convolutional neural network may include both information in a single frame image (e.g., grayscale, color, gradient values, etc. in a single frame image) and optical flow information between different frames.

In some embodiments, the image processing module is an image processing neural network using a 2D convolutional neural network. In some embodiments, the image processing module may include a single-frame analysis sub-module that processes single-frame information and a multi-frame analysis sub-module that processes inter-frame information.

In some embodiments, the single-frame analysis sub-module is configured to analyze a single image frame to identify information of the human body part or other objects, the texture information, the information about whether a sexual play event occurs, and the type of the sexual play event.

In some embodiments, the multi-frame analysis sub-module is configured to analyze the difference between a current frame and one or more before and after frames to obtain information such as the speed of an action in the sexual play event, the direction of the action, and the location of at least one human body part at each sampling analysis time point during the sexual action. For example, the multi-frame analysis sub-module analyzes the optical flow between the current frame and one or more before and after frames to obtain the above information. The current frame is the frame that the multi-frame analysis sub-module is currently processing. The before and after frames are the frames before and after the current frame in the frame sequence of the video segment (or the frame sequence sampled by the video pre-processing module). The frames before the current frame are also called as historical frames and the frames after the current frame are also called as future frames.

In some embodiments, the multi-frame analysis sub-module is configured to perform multi-frame analysis of multiple frames over a time period to identify frequencies of a periodic action in the sexual play event, and/or frequency variations of the periodic action in the sexual play event, and/or a duration of the sexual play event, and/or an intensity-degree distribution of the sexual play event, etc.

The single-frame analysis sub-module may further include some specialized subunits, such as a subunit for human body part identification, a subunit for texture identification, a subunit for object identification, a subunit for identification of type of sexual play event, etc. The subunits may be trained separately. The subunits may have been pre-trained elsewhere, and may be integrated directly into the video processing module.

In some embodiments, the sound processing module applies the 2D convolutional neural network. The convolution kernel of the sound processing module may include both temporal and sound amplitude dimensions. The sound processing module may identify sound information such as sound frequency, sound loudness, timbre, frequency domain distribution, sound semantics, the type of action characterized by the sound, the level of emotion characterized by the sound, etc. The sound information may assist in determining whether a sexual play event occurs, the type of the sexual play event, the speed of an action in the sexual play event, frequencies of a periodic action, frequency variations of the periodic action, a duration of the sexual play event, an intensity-degree of the sexual play event, etc. For example, the sound processing module may identify a particular sound pattern that typically indicates that a woman is in an orgasmic state. Alternatively, for example, the sound processing module may identify another specific sound pattern that indicates that oral sex is occurring.

The sound processing module may employ a sound recognition processing algorithm to identify the sound information. The sound recognition processing algorithm may be, for example, an algorithm based on dynamic time warping (DTW), an algorithm based on hidden Markov models (HMM) of parametric models, or an algorithm based on vector quantization of non-parametric models, an algorithm based on artificial neural networks, etc.

In some embodiments, the video processing software may also include an image-and-sound fusion module. The image-and-sound fusion module is configured to fuse the information identified by the image processing module and the sound processing module to produce desired information relative to the sexual action.

In some embodiments, instead of including separate image processing modules and sound processing modules, the video processing software may include a video processing module. The convolutional kernel in the convolutional neural network of the video processing module may contain at least temporal, sound amplitude, and image dimensions to simultaneously capture multiple frames of image information, single frame of image information, sound information, etc., so as to combine both image and sound to determine the presence or absence of a sexual play event, the type of the sexual play event, frequencies of an action of the human body part, the direction of the action, the duration of the action, and other information as described above, which is not limited herein.

III. Sexual Stimulation Method

Figure 2:
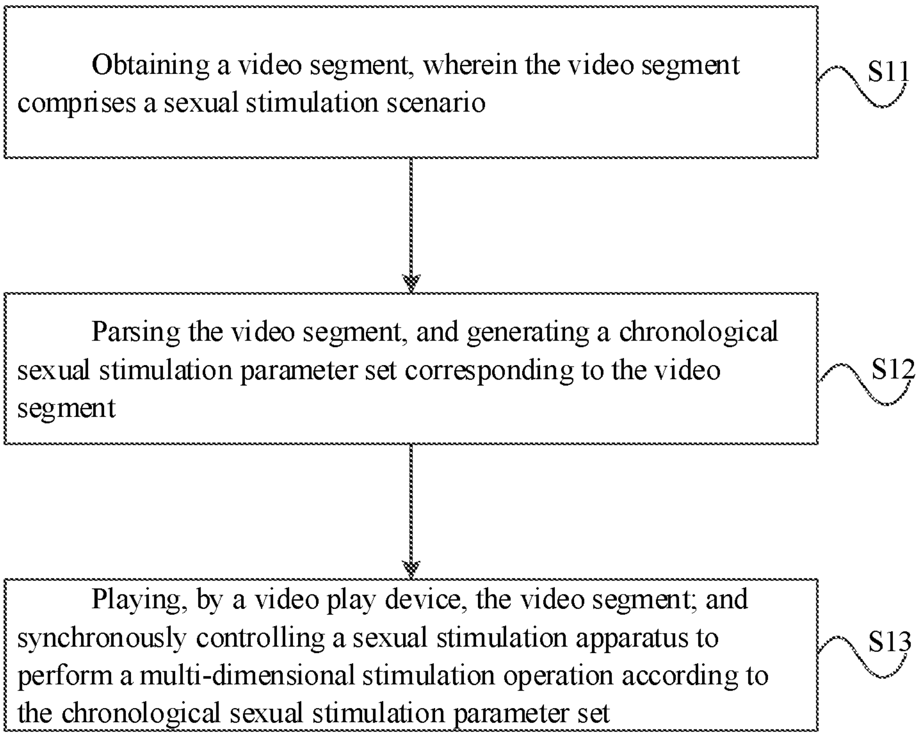
FIG. 2 is a flowchart of a sexual stimulation method according to an embodiment of the present disclosure.

Referring to FIG. 2, the present disclosure provides a sexual stimulation method including the following operations.

At block S11: obtaining a video segment, wherein the video segment comprises a sexual stimulation scenario.

In some embodiments, the video segment is derived from a locally stored video. For example, the video segment may be a video stored in a memory of the sexual stimulation apparatus. The video segment may also be a video stored in a local video play device. The local video play device may be, for example, a computer, a cell phone, a tablet, a television, etc. The video segment may also be a video segment stored on a removable medium such as a portable hard drive, USB flash drive, CD, DVD, etc.

In some embodiments, the video segment is derived from an online video stream. The online video stream is, for example, an online live stream or online video. In the online live stream, the user may access video data sent by an online live streamer via the international Internet, a mobile network, or a dedicated communication line to play or parse on the local device. The online video may be an online video accessed through a web address. The user may also download or buffer the online video to the local device for playing or parsing.

In some embodiments in which the video segment is derived from the online video stream, one of the video play device and the sexual stimulation apparatus is configured to obtain the video segment currently playing in the online video stream over the network and transmit the video segment to the other of the video play device and the sexual stimulation apparatus over a communication path.

At block S12: parsing the video segment, and generating a chronological sexual stimulation parameter set corresponding to the video segment.

In some embodiments, the video segment is parsed and the chronological sexual stimulation parameter set corresponding to the video segment is generated by a video processing software. The video processing software may be a machine-learning video processing model such as the above neutral network model.

In some embodiments, the video processing software stated above may be a program dedicated to process the sexual stimulation scenario, thereby parsing the video segment and generating the chronological sexual stimulation parameter set corresponding to the video segment. The dedicated program may not be a dedicated program trained in a machine learning manner, but in other manners to process the video segment with the sexual stimulation scenario. The dedicated program may be, for example, an application software miming in the video play device (e.g., computer, mobile terminal, etc.), the sexual stimulation apparatus, or a server.

In some embodiments, the dedicated program may apply a wavelet analysis method to parse the video segment, extract time-domain information and frequency-domain information from the video segment, and generate the chronological sexual stimulation parameter set corresponding to the video segment.

In some embodiments, the dedicated program may apply a target tracking algorithm to parse the video segment, extract features of the video segment, and generate the chronological sexual stimulation parameter set corresponding to the video segment. The target tracking algorithm includes target feature extraction and target tracking. The target feature extraction may be mainly divided into: color histogram of a target area as features, contour features of the target, texture features of the target, etc. The target tracking may be mainly divided into: mean shift algorithm, Kalman filter-based target tracking, particle filter-based target tracking, methods based on modeling of moving targets, etc. Therefore, the dedicated program may be unlike a neural network model, which requires a large amount of machine learning training process. The dedicated program may analyze and process the video segment based on a preset algorithmic procedure to generate the chronological sexual stimulation parameter set corresponding to the video segment.

As described above, the above video processing software (the neural network model or dedicated program) may generate a chronological sexual stimulation parameter set corresponding to the video segment based on the video data and/or audio data in the video segment. The video data may be, for example, video stream data obtained by de-multiplexing the video segment or image frames obtained by decoding the video segment, etc. The audio data may be, for example, audio data obtained by de-multiplexing the video segment.

The chronological sexual stimulation parameter set may be a sexual stimulation parameter set that includes a plurality of sexual stimulation parameter sets in sequential order along the time dimension. For example, a sexual stimulation parameter set D1 in the chronological sexual stimulation parameter set corresponds to a play moment t1 in the video segment, while another sexual stimulation parameter set D2 in the chronological sexual stimulation parameter set corresponds to another play moment t2 in the video segment.

In some embodiments, the sexual stimulation parameter set may include a timestamp or time-tag. The timestamp characterizes the position in the video segment of the image frame corresponding to the sexual stimulation parameter set. The timestamp, for example, characterizes the play moment of the corresponding image frame. In some embodiments, the timestamp characterizes the serial number of the corresponding image frame in the video segment. For example, the timestamp has a value of X, indicating that the image frame corresponding to the timestamp is the Xth image frame in the video segment.

The chronological sexual stimulation parameter set may be stored with the video segment. In some embodiments, the chronological sexual stimulation parameter set may be stored in a different medium than the video segment. The chronological sexual stimulation parameter set may further include identification information of the video segment for subsequent matching of the chronological sexual stimulation parameter set to the video segment. For example, the chronological sexual stimulation parameter set may further include a hash value of the video segment. Only if the hash value of the video segment is the same as the hash value written in the chronological sexual stimulation parameter set may the chronological sexual stimulation parameter set be determined to match the video segment.

In some embodiments, the sexual stimulation parameter set includes multi-dimensional sexual stimulation parameters. For example, the multi-dimensional sexual stimulation parameters may include at least two of the following parameters: a sexual stimulation parameter of at least one human body part in an axial direction, a sexual stimulation parameter of at least one human body part in a radial direction, and a sexual stimulation parameter of at least one human body part in a circumferential direction.

In some embodiments, the multi-dimensional sexual stimulation parameters may further include at least two of the following parameters: a temperature-based stimulation parameter of at least one human body part, a humidity-based stimulation parameter of at least one human body part, and a lubricity-based stimulation parameter of at least one human body part.

In some embodiments, the at least one human body part is a human body part applied with a sexual stimulation. For example, in a general male and female sexual scenario, the at least one human body part is a penis and/or a vagina. It is readily understood by those skilled in the art that in other sexual scenarios, the at least one human body part may also be, for example, a tongue, a mouth, a rectum, breasts, etc.

In some embodiments, when the sexual stimulation scenario is a seduction scenario, the at least one human body part is a human body part that makes the teasing and seducing action. For example, in a provocative scene of hip twerking, the at least one human body part is the performer's buttocks, etc.

In the case where the human body part is a penis, for example, the axial direction of the human body part may be the length direction of the penis. An arbitrary cross-section of the penis may be obtained perpendicular to the axial direction. The radial direction of the penis is a direction of the radius passing through the center of the circle of the substantially circular cross-section in a cross-section of the penis, and the circumferential direction of the penis is a direction along the circumference of the edge of the substantially circular cross-section of the penis, i.e., the circumferential direction around a lateral surface of the penis.

In particular, e.g., the circumferential direction of glans, clitoris, nipples, etc. is the circumferential direction around their lateral surfaces. For example, in a scenario where a man and a woman are having sex in missionary position, the multi-dimensional sexual stimulation parameters may include the depth of the penis penetration into the vagina and the frequency of penetration (i.e., sexual stimulation parameters in the axial direction of the penis or vagina), the compression of the vagina by the penis or the compression of the penis by the vagina due to the expansion of the penis (i.e., sexual stimulation parameters in the radial direction of the penis or vagina), the relative rotation (i.e., sexual stimulation parameters in the circumferential direction of the penis or vagina), the intensity of sexual stimulation to the man or woman, and the frequency of stimulation, etc. The multi-dimensional sexual stimulation parameters may also include the temperature, humidity, or lubrication of the penis or vagina.

The specific sexual stimulation parameters in other scenarios may be derived from that specific scenario and are covered by the scope of the present disclosure and are not repeated herein.

In some embodiments, the operation S12 may be performed by the server, the video play device, or the sexual stimulation apparatus, without limitation in the present disclosure. The server is, for example, a cloud-based server. The server is provided, for example, by the manufacturer of the sexual stimulation apparatus.

At block S13: playing, by a video play device, the video segment; and synchronously controlling a sexual stimulation apparatus to perform a multi-dimensional stimulation operation according to the chronological sexual stimulation parameter set.

In some embodiments, the video segment is decoded and played back by the video play device separate from the sexual stimulation apparatus. The video play device may communicate with the sexual stimulation apparatus via, for example, Bluetooth, Wi-Fi, the Internet, and other means.

In some embodiments, the sexual stimulation apparatus may further include a video play unit integrated therein, and the video segment may be played on the integrated video play unit.

While the video segment is being played by the video play unit, the sexual stimulation apparatus is synchronously controlled to perform the multi-dimensional sexual stimulation operation with the chronological sexual stimulation parameter set. As can be seen above, the chronological sexual stimulation parameter set is synchronized with the video segment based on the play time of the video segment or the sequence number of the image frames, etc. to perform the multi-dimensional sexual stimulation operations by controlling the sexual stimulation apparatus, thereby producing the multi-dimensional sexual stimulation to the user.

For example, at the play moment t1 of the video segment, the multi-dimensional sexual stimulation operation is performed with the sexual stimulation parameter set D1 of the stimulation parameter set corresponding to the play moment t1. And at the play moment t2 of the video segment, the multi-dimensional sexual stimulation operation is performed with the sexual stimulation parameter set D2 of the stimulation parameter set corresponding to the play moment t2.

In the above way, the sexual stimulation operation of the sexual stimulation apparatus felt by the user at any play moment t1 or t2 corresponds to the sexual play event in the video segment being played, thus increasing the sensory dimension of sexual stimulation, adding a new multi-dimensional sense of touch in addition to the traditional experience of vision and hearing, making it easier for the user to feel immersive and thus enhancing the sexual pleasure obtained by the user.

Figure 3:
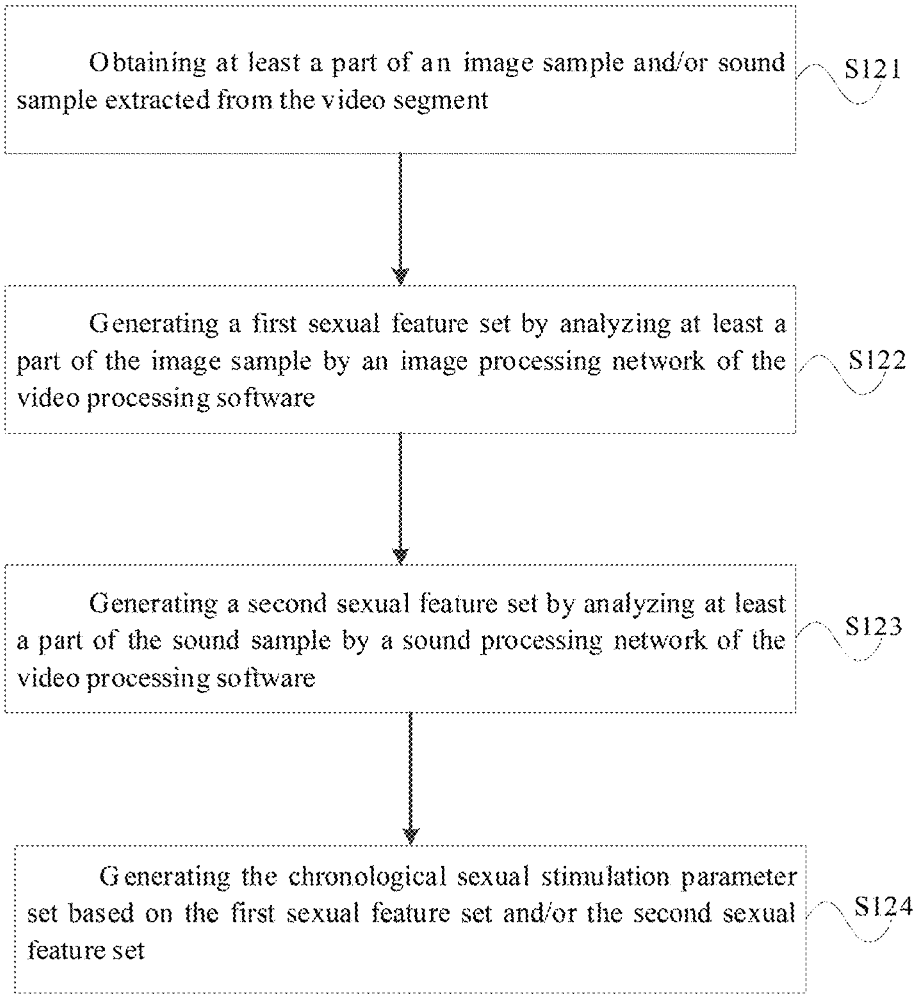
FIG. 3 is a flowchart of a method for parsing a video segment and generating a corresponding chronological sexual stimulation parameter set according to an embodiment of the present disclosure.

Referring to FIG. 3, FIG. 3 is a flowchart of a method for parsing a video segment and generating a corresponding chronological sexual stimulation parameter set according to an embodiment of the present disclosure. The method may include operations as followed.

At block S121: obtaining at least a part of an image sample and/or sound sample extracted from the video segment.

In general, the video segment includes the video data and sound data. The sound data is also called an audio track. The video data and sound data may be separated in a manner known to those skilled in the art depending on the format of the video segment. For example, the sound data and the video data or bitstream may be obtained by de-multiplexing the video segment. Further decoding of the video data or the bitstream may result in the image frames. In the embodiments, the decoded image frames are configured as the image samples and the de-multiplexed sound data is configured as the sound samples. It is understood by those skilled in the art that the de-multiplexed sound data may also be framed to form audio frames to correspond to the decoded image frames and as the sound samples. The image samples and sound samples may be configured for subsequent analysis to extract the sexual feature of the video segment regarding the sexual action.

At block S122: generating a first sexual feature set by processing at least a part of the image sample by an image processing network of the video processing software; wherein the first sexual feature set includes an occurrence identifier for a sexual play event, a type identifier for the sexual play event, a speed of an action in the sexual play event, a direction of the action in the sexual play event, a position of at least one human body part at each sampling analysis time point during an action process in the sexual play event, frequencies of a periodic action in the sexual play event, frequency variations of the periodic action in the sexual play event, a duration of the sexual play event, an intensity-degree distribution of the sexual play event, etc.

Specifically, the occurrence identifier for a sexual play event characterizes whether a sexual play event is occurring in the current frame. The type identifier for the sexual play event characterizes the type of sexual play event that is currently occurring. The speed and/or direction of an action in the sexual play event characterizes the speed and/or direction of the action of at least one human body part during the currently occurring sexual play event, such as the speed and/or direction of an action of a penis inserted into a vagina, the speed and/or direction of an action of a tongue tip licking a nipple, etc. The position of at least one human body part at each sampling analysis time point during an action process in the sexual play event characterizes the position of the at least one human body part corresponding to each frame in the multi-frame image, such as a position of the penis relative to the vagina, etc. The frequencies of a periodic action in the sexual play event characterizes the frequencies of the periodic sexual action currently being performed, e.g., the frequencies of penis thrusting action, the frequencies of buttock twisting, etc. The frequency variations of the periodic action in the sexual play event characterizes the tendency and magnitude of the change in the frequencies of the periodic sexual action, such as the increase or decrease in the frequencies of the penis thrusting action into the vagina, etc. The duration of the sexual play event characterizes the duration of the current sexual play event. The intensity-degree distribution of the sexual play event characterizes the tendency of the distribution of intense sexual play events occurring over a period of time on a time axis. The intensity-degree of the sexual play event may be quantified, for example, by information about the frequencies of a periodic action in the sexual play event and/or information about the frequency variations of the periodic action in the sexual play event.

At block S123: generating a second sexual feature set by processing at least a part of the sound sample by a sound processing network of the video processing software.

In some embodiments, the sound processing network is configured to analyze sound frequency, sound loudness, timbre, frequency domain distribution, sound semantics, a type of an action characterized by a sound, and an emotion-level characterized by the sound in the at least a part of the sound sample to assist in determining whether the sexual play event occurs, the type of the sexual play event, the speed of the action in the sexual play event, the frequencies of the periodic action, the frequency variations of the periodic action, the duration of the sexual play event, and the intensity-degree of the sexual play event to generate the second sexual feature set. The second sexual feature set includes at least one of: an occurrence auxiliary identifier of the sexual play event, a type auxiliary identifier of the sexual play event, auxiliary information for the speed of the action in the sexual play event, auxiliary information for the frequencies of the periodic action in the sexual play event, auxiliary information for the frequency variations of the periodic action in the sexual play event, auxiliary information for the duration of the sexual play event, and auxiliary information for the intensity-degree distribution of the sexual play event.

The occurrence auxiliary identifier of the sexual play event is configured to assist in determining whether the sexual play event has occurred. The type auxiliary identifier of the sexual play event is configured to assist in determining the type of the sexual play event. The auxiliary information for the speed of the action in the sexual play event is configured to assist in determining the speed of an action of at least one human body part in the sexual play event. The auxiliary information for the frequencies of the periodic action in the sexual play event is configured to assist in determining the frequencies of the current periodic action. The auxiliary information for the frequency variations of the periodic action in the sexual play event is configured to assist in determining the tendency and magnitude of the change in the frequencies of the periodic sexual action. The auxiliary information for the duration of the sexual play event is configured to assist in determining the duration of the current sexual play event. The auxiliary information for the intensity-degree distribution of the sexual play event is configured to assist in determining the intensity-degree distribution of the sexual play events occurring over a period of time.

In some embodiments, the sound processing network may analyze the sound frequency, sound loudness, timbre, frequency domain distribution, sound semantics, the type of an action characterized by a sound, and the emotion-level characterized by the sound in the at least a part of the sound sample to identify relative feature of the sexual stimulation scenario. For example, the sound processing network may identify the gender of the person making the sound based on the frequency of the sound. For example, the sound processing network may determine that no sexual play event is occurring based on the relaxed conversation of a man and a woman. Alternatively, the sound processing network may determine that a sexual play event has occurred based on the moans of a woman. Alternatively, the sound processing network may determine that the sexual play event that occurred was oral sex based on the specific sucking sound of a woman. Alternatively, the sound processing network may determine the lubrication of a human body part based on the emotional expression of the sound, etc. Other scenarios may be similarly envisioned by those skilled in the art and are not repeated in the present disclosure.

It should be understood by those skilled in the art that the present disclosure does not limit the order in which the operations S122 and S123 are performed. The operations S122 and S123 may be performed simultaneously, crosswise, or sequentially, which is not limited herein.

At block S124: generating the chronological sexual stimulation parameter set based on the first sexual feature set and/or the second sexual feature set.

Based on the occurrence identifier for a sexual play event, the type identifier for the sexual play event, a speed of an action in the sexual play event, the direction of the action in the sexual play event, the position of at least one human body part at each sampling analysis time point during an action process in the sexual play event, the frequencies of a periodic action in the sexual play event, the frequency variations of the periodic action in the sexual play event, the duration of the sexual play event, the intensity-degree distribution of the sexual play event, etc. in the first sexual feature set, and/or the occurrence auxiliary identifier of the sexual play event, the type auxiliary identifier of the sexual play event, the auxiliary information for the speed of the action in the sexual play event, the auxiliary information for the frequencies of the periodic action in the sexual play event, the auxiliary information for the frequency variations of the periodic action in the sexual play event, the auxiliary information for the duration of the sexual play event, and the auxiliary information for the intensity-degree distribution of the sexual play event in the second sexual feature set, matched chronological sexual stimulation parameters are generated to construct the chronological sexual stimulation parameter set.

When the user watches the video, the user may feel the dual stimulation of both image and sound in the video, and both play an important role in the users perception. Moreover, since the human body parts in the image may be obscured, the determination based solely on the image parameters may not be accurate. Therefore, it is helpful to combine the analysis results of images and sounds to generate the final chronological sexual stimulation parameter set.

In some embodiments, when one of the parameters in the first sexual feature set is missing, the determination may be assisted based on the parameters in the second sexual feature set. For example, due to screen switching and other reasons, at some moments in the video segment, sexual images may not be visible, but the sex-related sounds are still present. In this case, when the occurrence identifier for a sexual play event in the first sexual feature set characterizes no sexual play event occurrence, and the occurrence auxiliary identifier of the sexual play event in the second sexual feature set characterizes a sexual play event occurrence, the determination of whether there is a sexual play event occurrence is made based on the occurrence auxiliary identifier of the sexual play event in the second sexual feature set and the subsequent parameters in the first sexual feature set and the second sexual feature set combined.

In some embodiments, the chronological sexual stimulation parameter set is generated based on the first sexual feature set and/or the second sexual feature set by the video processing software.

Figure 4:
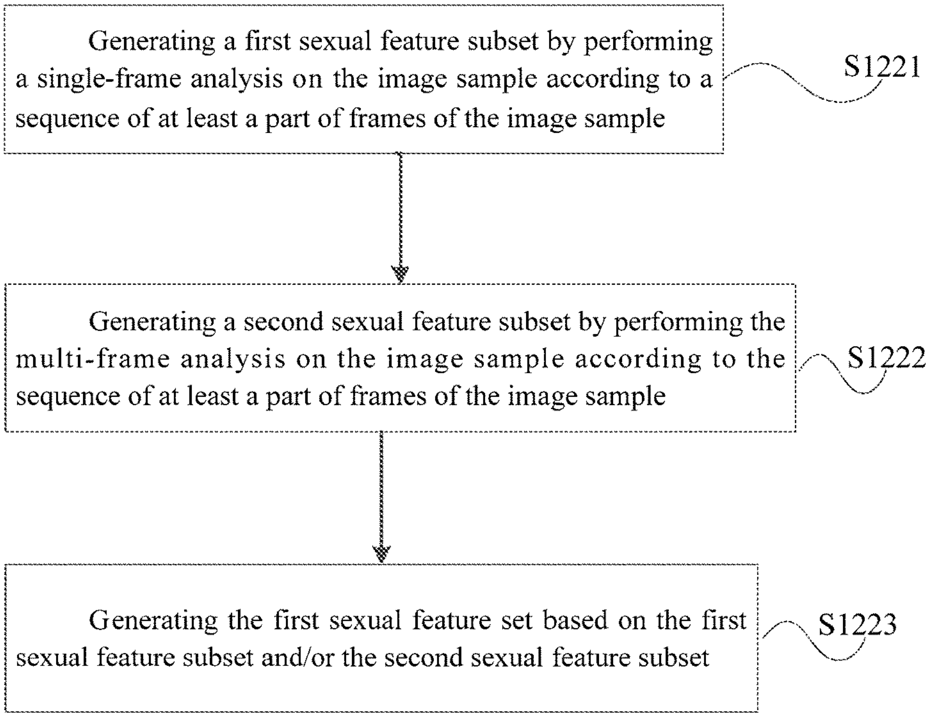
FIG. 4 is a flowchart of a method for generating a first sexual feature set by analyzing at least a part of an image sample by an image processing network of a video processing software according to an embodiment of the present disclosure.

Referring to FIG. 4, FIG. 4 is a flowchart of a method for generating a first sexual feature set by analyzing at least a part of an image sample by a video processing software according to an embodiment of the present disclosure. The method may include operations as followed.

At block S1221: generating a first sexual feature subset by performing a single-frame analysis for the image sample according to a sequence of at least a part of frames of the image sample; wherein the first sexual feature subset includes an occurrence identifier for a sexual play event and/or a type identifier for the sexual play event.

In some embodiments, the image processing network is configured to identify whether the sexual play event occurs and generate the corresponding occurrence identifier for the sexual play event by performing a single-frame analysis for the image sample according to a sequence of at least a part of frames of the image sample.

In some embodiments, the image processing network is configured to identify the type of the sexual play event and generate the corresponding type identifier for the sexual play event by performing a single-frame analysis for the image sample according to a sequence of at least a part of frames of the image sample.

The single-frame analysis refers to the analysis of an individual image frame by the image processing network.

In some compression methods for video, the image frames include a keyframe and a delta frame. The keyframe includes a complete image, while the delta frame only stores changes or differences in the image relative to the keyframe to reduce redundant information. Taking the H.264 video coding standard as an example, three types of frames are defined in the H.264 protocol: a complete encoded frame is called an I-frame, (i.e. intra-coded frame); a frame generated by referring to a previous I-frame and containing only the differences from the I-frame is called a P-frame (i.e., a forward predicted frame); and a frame encoded by referring to a before-and-after frame is called a B-frame (i.e., a bidirectional predicted frame). A series of images starting from one I-frame and ending at the frame before the next I-frame is called a sequence. The image processing network may use the motion tendency reflected by the P-frames and B-frames to obtain multi-frame information more easily.

In some embodiments, the image processing network performs single-frame analysis of keyframes or I-frames based on the sequence of at least a part of frames of the image sample.

In some embodiments, the image processing network performs a single-frame analysis on frames selected at predetermined intervals from the image sample based on the sequence of at least a part of frames of the image sample. For example, the image processing network performs a single-frame analysis on only the first of every five frames in the image sample. In some embodiments, the predetermined interval may vary with a compression ratio of the video segment. For example, when the compression ratio of the video segment is a first compression ratio, the image processing network performs a single-frame analysis for every X1 frames. When the compression ratio of the video segment is a second compression ratio greater than the first compression ratio, the image processing network performs a single-frame analysis for every X2 frames, and X2 is greater than X1. This is because the greater the compression ratio of the video segment, the less the variation between frames and the frequency of the single-frame analysis may be reduced accordingly.

In some embodiments, the image processing network may identify key information in an individual image frame, such as a human sex organ, a bed, a sex toy, etc., through the single-frame analysis. In some embodiments, the image processing network may identify the presence of a sexual play event in the current image frame and/or classify the type of the sexual play event based on the key information, and generate the first sexual feature subset based on the classification results.

In some embodiments, the image processing network may identify texture information, such as skin color, facial expressions, etc., in an individual image frame. For example, the image processing network may determine the intensity of sexual pleasure, whether the subject is about to orgasm, etc., based on the identified facial expressions. For example, the image processing network may determine information such as the temperature of the human body part based on the identified skin color. For example, the image processing network may determine the humidity information of the human body part based on the identified sheen of the human body part, etc.

At block S1222: generating a second sexual feature subset by performing the multi-frame analysis for the image sample according to the sequence of at least a part of frames of the image sample; wherein the second sexual feature subset includes: information for the speed of the action in the sexual play event, and/or information for the direction of the action in the sexual play event, and/or information for the position of the at least one human body part at each sampling analysis time point during the action process in the sexual play event, and/or information for the frequencies of the periodic action in the sexual play event, and/or information for the frequency variations of the periodic action in the sexual play event, and/or information for the duration of the sexual play event, and/or information for the intensity-degree distribution of the sexual play event.

The information stored in the delta frames (or P-frames, B-frames) reflects motion tendency in the image. The image processing network may use the motion tendency reflected by the delta frames to more easily obtain the multi-frame information.

In some embodiments, the multi-frame analysis of the image sample may also be performed to generate the occurrence identifier for the sexual play event and/or the type identifier for the sexual play event, which is not limited herein.

At block S1223: generating the first sexual feature set based on the first sexual feature subset and/or the second sexual feature subset.

In some embodiments, the image processing network combines the first sexual feature subset and/or the second sexual feature subset to generate the first sexual feature set.

In some embodiments, for N (which is an integer greater than 1) consecutive image frames, the image processing network performs a single-frame analysis on the first image frame and the Nth image frame to obtain the first sexual feature subset, and performs the multi-frame analysis on the intermediate image frames in between to obtain the second sexual feature subset. The first sexual feature subset of the intermediate image frames for which the multi-frame analysis is performed may be interpolated by referring to the first sexual feature subset of the first image frame or the Nth image frame, while the second sexual feature subset of the first or Nth image frame for which the single-frame analysis is performed may be interpolated by referring to the second sexual feature subset of the intermediate image frames.

Figure 5:
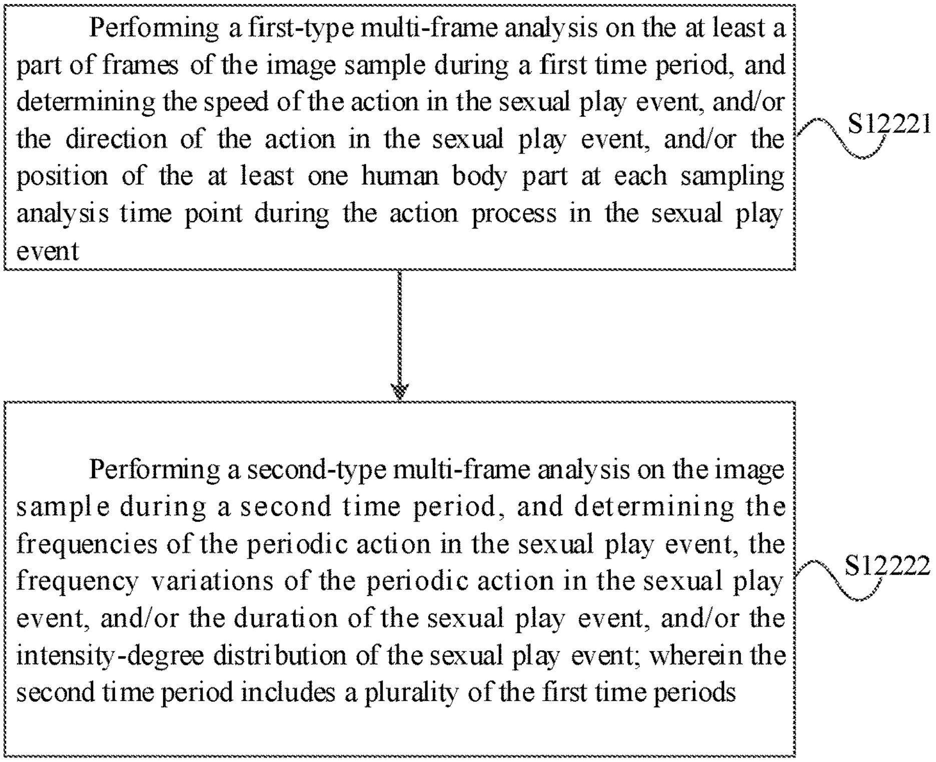
FIG. 5 is a flowchart of a method for generating a second sexual feature subset by performing a multi-frame analysis on an image sample according to a sequence of frames of the image sample according to an embodiment of the present disclosure.

Referring to FIG. 5, FIG. 5 is a flowchart of a method for generating a second sexual feature subset by performing a multi-frame analysis for an image sample according to a sequence of at least a part of frames of the image sample according to an embodiment of the present disclosure. The method may include operations as followed.

At block S12221: performing a first-type multi-frame analysis on the at least a part of frames of the image sample during a first time period, and determining the speed of the action in the sexual play event, and/or the direction of the action in the sexual play event, and/or the position of the at least one human body part at each sampling analysis time point during the action process in the sexual play event.

In some embodiments, the information for the speed of the action is generated based on the speed of the action in the sexual play event. In some embodiments, the information for the direction of the action is generated based on the direction of the action in the sexual play event. In some embodiments, the information for the position of the at least one human body part at each sampling analysis time point during the action process is generated based on the position of the at least one human body part at each sampling analysis time point during the action process in the sexual play event.

During the first time period, a plurality of image frames, such as at least two image frames, are present.

In some embodiments, during the first-type multi-frame analysis, the image processing network may analyze the difference between the current frame and one or more before and after frames. For example, the image processing network may track at least one human body part and analyze the change in position of the at least one human body part between the current frame and the one or more before and after frames to obtain, for example, the speed of action, direction of action, and/or position information. For example, the image processing network may identify a certain action pattern, e.g., the action of a penis in and out of a vagina, and analyze the speed of penis movement, direction of movement, etc. at a certain image frame. The image processing network may also identify the position of a human body part at each sampling analysis time point corresponding to an image frame in the image sample. For example, the image processing network may identify the action of the penis in and out of the vagina and identify the relative position of the penis with respect to the vagina.

At block S12222: performing a second-type multi-frame analysis on the image sample during a second time period, and determining the frequencies of the periodic action in the sexual play event, the frequency variations of the periodic action in the sexual play event, and/or the duration of the sexual play event, and/or the intensity-degree distribution of the sexual play event; wherein the second time period includes a plurality of the first time periods.

In some embodiments, the information for the frequencies of the periodic action is generated based on the frequencies of the periodic action in the sexual play event. In some embodiments, the information for the frequency variations of the periodic action is generated based on the frequency variations of the periodic action in the sexual play event. In some embodiments, the information for the duration of the sexual play event is generated based on the duration of the sexual play event. In some embodiments, the information for the intensity-degree distribution of the sexual play event is generated based on the intensity-degree distribution of the sexual play event.

In some embodiments, during the multi-frame analysis, when the human body part makes a regular action, the image processing network may describe the action of the human body part in terms of the frequency of the action, the phase of the action, and the amplitude of the action. For example, in the action of the penis periodically inserting into the vagina, the penis entering and leaving the vagina once form a cycle. The frequency of the action may indicate the frequency of penis insertion, the phase of the action may indicate the current relative position of the penis relative to the vagina during the cycle, and the amplitude of the action may indicate the deepest depth of penis insertion. In some embodiments, the speed of the action, direction of the action, and position information during the action described above may be generated based on the frequency of the action, the phase of the action, and the amplitude of the action.

During the second time period, a plurality of image frames are present. In some embodiments, the second time period is greater than the first time period and includes more image frames than that of the first time period. In some embodiments, the second time period includes a plurality of first time periods. In some embodiments, the image frames within the second time period may include a plurality of periodic actions. In some embodiments, the image frames within the second time period may include a complete segment of continuous periodic action, such as including a complete and continuous segment of missionary body position intercourse from the beginning to the end.

It should be understood by those skilled in the art that the length of the first time period and the second time period may be variable, which may vary depending on the format and content of the specific video segment, etc.

It is readily understood by those skilled in the art that the operations S12221, S12222 may be performed simultaneously, separately, selectively or crosswise, etc., and the present disclosure does not limit the order of their performance.

1. Use of Bitstream for Video

As mentioned above, at least part of the sound data and the video data or the bitstream may be extracted by demultiplexing the video segment. The video data or the bitstream is further decoded to obtain image frames.

Taking H264 video format as an example, the bitstream for the video may consist of a series of network abstraction layer units (NALUs). Depending on whether the NALU is encoded with data cut and/or the type of image frame, a single image frame may correspond to one NALU or multiple NALUs.

As described above, the generating the first sexual feature set by processing at least a part of the image sample by the image processing network of the video processing software is already disclosed. In some embodiments, the first sexual feature set may be generated by directly processing the bitstream by the image processing network of the video processing software.

In some embodiments, the bitstream is analyzed during the first time period to identify the speed of the action in the sexual play event, and/or the direction of the action in the sexual play event, and/or the position of the at least one human body part at each sampling analysis time point during the action process in the sexual play event.

In some embodiments, the bitstream is analyzed during the second time period to identify the frequencies of the periodic action in the sexual play event, the frequency variations of the periodic action in the sexual play event, and/or the duration of the sexual play event, and/or the intensity-degree distribution of the sexual play event.

The video processing software may be trained to achieve the above functions. For example, the video data (or bitstream) and the first sexual feature set corresponding to the image frame may be input to the video processing software for training. However, the present disclosure does not limit the specific training process.

By generating the first sexual feature set directly from the bitstream, the computational resources and time required for the chronological sexual stimulation parameter set may be economized.

2. Sexual Stimulation Parameter Set

The second row of Table 1 below illustrates an example of a sexual stimulation parameter set of the chronological sexual stimulation parameter set. As shown in Table 1, the sexual stimulation parameter set of the chronological sexual stimulation parameter set may include a timestamp TS for synchronization with the video segment, a parameter P1 characterizing whether a sexual play event occurs, a parameter P2 characterizing the type of the sexual play event, a parameter P3 characterizing an axial action of a human body part 1, a parameter P4 characterizing a radial action of the human body part 1, a parameter P5 characterizing a circumferential action of the human body part 1, a parameter P6 characterizing the frequencies of a periodic action of the human body part 1, a parameter P7 characterizing an axial action of a human body part 2, a parameter P8 characterizing a radial action of the human body part 2, a parameter P9 characterizing a circumferential action of the human body part 2, etc.

In some embodiments, the timestamp TS may be a video play moment or a serial number of the image frame, etc.

In some embodiments, the parameter P1 characterizing whether a sexual play event occurs may be a Boolean value, wherein 1 means that a sexual play event occurs and 0 means that no sexual play event occurs.

In some embodiments, the parameter P1 characterizing whether a sexual play event occurs may be a number less than or equal to 1. In some embodiments, the parameter P1 indicates the probability of the occurrence of the sexual play event.

In some embodiments, the parameter P2 characterizing the type of the sexual play event may be an integer of which meaning of taking a value may be predefined. For example, when P2 is equal to 1, it indicates a missionary type of sex; when P2 is equal to 8, it indicates oral sex, etc.

In some embodiments, the human body part 1, the human body part 2, etc. may be predefined. For example, the human body part 1 denotes penis, the human body part 2 denotes vagina, etc.

In some embodiments, the axial action of the human body part 1 characterizes the axial position, direction of action, etc. of the human body part 1. The meanings of other parameters may be similarly inferred and are not repeated herein.

sexual stimulation apparatus, the control signal corresponding to the sexual stimulation parameter of the penis in the radial direction is configured to control a squeezing pressure of the male sexual stimulation apparatus on the penis, the control signal corresponding to the sexual stimulation parameter of the glans in the circumferential direction is configured to control a rotation speed of a corresponding part of the male sexual stimulation apparatus around the glans, the control signal corresponding to the temperature sexual stimulation parameter is configured to control the temperature in the male sexual stimulation apparatus, the control signal corresponding to the humidity sexual stimulation parameter is configured to control the humidity in the male sexual stimulation apparatus, and the control signal corresponding to the lubrication sexual stimulation parameter of the penis is configured to control the lubrication in the male sexual stimulation apparatus.

In some embodiments, the generation of the control signals may be performed by the processor in the sexual stimulation apparatus. In some embodiments, the generation of the control signals may also be performed with the video play device or the cloud-based server, and the generated control signals are sent to the sexual stimulation apparatus.

At block S132: synchronously controlling the sexual stimulation apparatus to perform the multi-dimensional stimulation operation according to the control signals.

In some embodiments, the control signals generated in the operation S131 are configured to control the sexual stimulation apparatus to perform at least two of the sexual stimulation in the radial direction, in the axial direction, and in the circumferential direction of the user's human body part. For example, when the sexual stimulation apparatus is a male sexual stimulation apparatus, it adjusts the length of engulfing the user's penis, the force of compressing the user's penis in the radial direction, and/or the rotation speed around the user's glans, etc., based on the corresponding control signals.

In some embodiments, the control signals generated in the operation S131 are configured to control the sexual stimulation apparatus to adjust at least two of the temperature, humidity, and lubricity of the sexual stimulation apparatus. For example, when the sexual stimulation apparatus is a male sexual stimulation apparatus, it adjusts the temperature, humidity, and/or lubricity, etc., within its working chamber according to the corresponding control signals.

TABLE 1

| Times tamp | Parameter indicating whether a sexual play event occurs | Parameter indicating the type of the sexual play event | Parameter indicating axial action of human body part 1 | Parameter indicating radial action of human body part 1 | Parameter indicating circumferential action of human body part 1 | Parameter indicating frequencies of periodic action of human body part 1 | Parameter indicating axial action of human body part 2 | Parameter indicating radial action of human body part 2 | Parameter indicating circumferential action of human body part 2 | . . . |
|---|---|---|---|---|---|---|---|---|---|---|
| TS | P1 | P2 | P3 | P4 | P5 | P6 | P7 | P8 | P9 | . . . |

Figure 6:
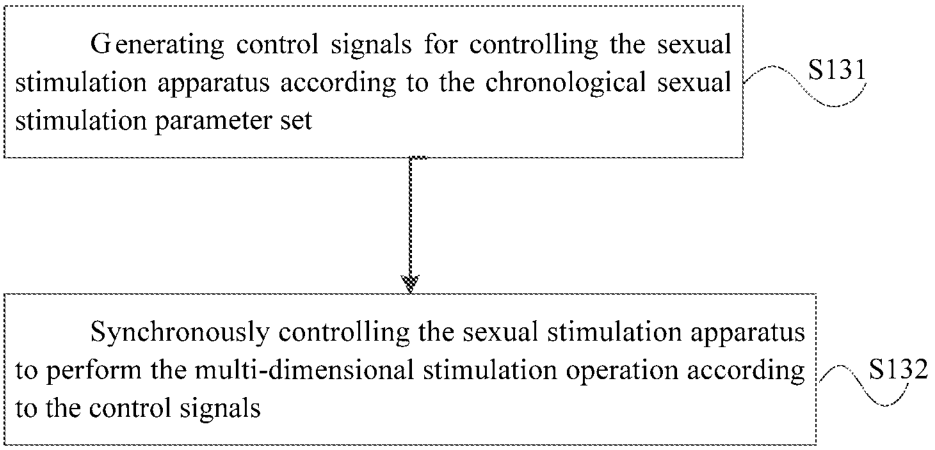
FIG. 6 is a flowchart of a method for playing by a video play device a video segment and synchronously controlling a sexual stimulation apparatus to perform a multi-dimensional stimulation operation according to a chronological sexual stimulation parameter set according to an embodiment of the present disclosure.

Referring to FIG. 6, FIG. 6 is a flowchart of a method for playing by a video play device a video segment and synchronously controlling a sexual stimulation apparatus to perform a multi-dimensional stimulation operation according to a chronological sexual stimulation parameter set according to an embodiment of the present disclosure. The method may include operations as followed.

At block S131: converting to generate control signals for controlling the sexual stimulation apparatus according to the chronological sexual stimulation parameter set.

Figure 7:
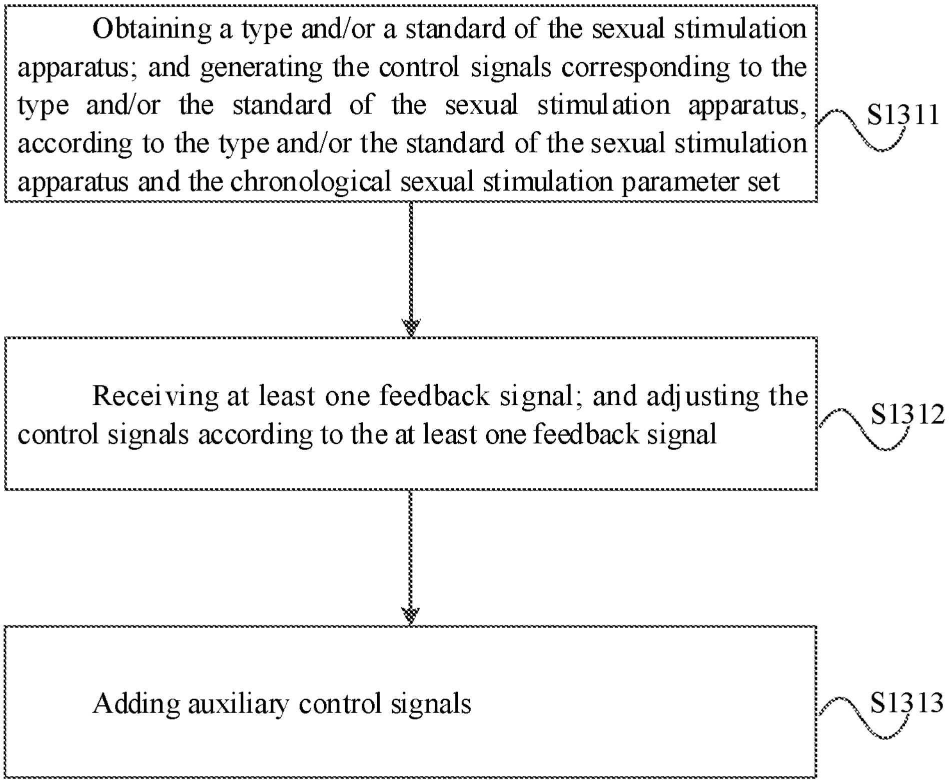
FIG. 7 is a flowchart of a method for generating control signals for controlling a sexual stimulation apparatus according to a chronological sexual stimulation parameter set according to an embodiment of the present disclosure.

For example, in embodiments in which the sexual stimulation apparatus is a male sexual stimulation apparatus, the control signal corresponding to the sexual stimulation parameter of the penis in the axial direction is configured to control a length of engulfment of the penis by the male Referring to FIG. 7, FIG. 7 is a flowchart of a method for converting to generate control signals for controlling a sexual stimulation apparatus according to a chronological sexual stimulation parameter set according to an embodiment of the present disclosure. The method may include at least one of the following operations.

At block S1311: obtaining a type and/or a standard of the sexual stimulation apparatus; and converting to generate the control signals corresponding to the type and/or the standard of the sexual stimulation apparatus, according to the type and/or the standard of the sexual stimulation apparatus and the chronological sexual stimulation parameter set.

The types of sexual stimulation apparatus used by users may vary, for example, male sexual stimulation apparatuses (e.g., male masturbators, sex dolls, etc.) and female sexual stimulation apparatuses (e.g., vibrators, nipple stimulators, etc.) have different types. Also, the same type of sexual stimulation apparatus may have different standards, such as male sexual stimulation apparatus for stimulating a small range of penis sizes, male sexual stimulation apparatuses for stimulating a medium range of penis sizes, or male sexual stimulation apparatuses for stimulating a large range of penis sizes. Thus, according to the sexual stimulation parameter set generated by parsing a same video segment, different control signals for different sexual stimulation apparatuses may be generated.

In the present disclosure, an identification code of the sexual stimulation apparatus may be obtained and control signals corresponding to the sexual stimulation apparatus may be generated based on the identification code. The identification code of the sexual stimulation apparatus corresponds to the type and standard of the sexual stimulation apparatus.

In some embodiments, a type and/or a standard of each of a plurality of sexual stimulation apparatuses may also be obtained, and a plurality of groups of control signals may be generated according to the types and the standard of each of the sexual stimulation apparatuses and the chronological sexual stimulation parameter set. Each of the groups of control signals is configured for matching with the type and the standard of a corresponding one of the sexual stimulation apparatuses respectively. For example, the parsed video segment is an online video, and multiple users may watch the same online video at the same time, so for the different sexual stimulation apparatuses used by multiple users, according to the chronological sexual stimulation parameter set generated by the parsed video segment and the type of each sexual stimulation apparatus, corresponding control signals may be generated for each sexual stimulation apparatus separately. For another example, a couple may watch the video segment at the same time, and according to the chronological sexual stimulation parameter set generated by parsing the video segment, corresponding control signals may be generated for the male and female sexual stimulation apparatuses respectively. For another example, a same user may use multiple sexual stimulation apparatuses for different body parts of the user respectively at the same time, and accordingly, corresponding control signals may be generated for each sexual stimulation apparatus.

At block S1312: receiving at least one feedback signal; and adjusting the control signals according to the at least one feedback signal.

In some embodiments, the at least one feedback signal includes at least one of: a first feedback signal, a second feedback signal, and a third feedback signal. The first feedback signal is generated in response to an application mode of the sexual stimulation apparatus being selected. The second feedback signal is generated automatically according to a response of at least one human body part for the multi-dimensional stimulation operation, and the response is detected by a sensor of the sexual stimulation apparatus. The third feedback signal is generated in response to a manual input.

Specifically, the same sexual stimulation apparatus may have different modes of operation. For example, the same male sexual stimulation apparatus may have operation mode 1, operation mode 2, etc. In different operating modes, the same male sexual stimulation apparatus may have different internal cavity depth, compression level on male sexual organs, temperature, humidity, etc. These modes may be pre-set by the manufacturer of the male sexual stimulation apparatus before the product is sold, or they may be customized by the user. The user may select a mode of operation and generate the first feedback signal based on the selected mode of operation, and subsequently adjust the control signals based on the first feedback signal.

In some embodiments, during the operation of the sexual stimulation apparatus, the sexual stimulation apparatus may automatically provide the second feedback signal to adjust at least one parameter of the control signals. For example, the sexual stimulation apparatus may include the sensor. The sensor may detect the size of a human sexual organ and provide the second feedback signal to change the amplitude of movement of the sexual stimulation apparatus. The sexual stimulation apparatus or other apparatuses used to generate the control signals may adjust a corresponding parameter of the control signals in response to the second feedback signal to correspondingly change the amplitude of movement of the sexual stimulation apparatus. In some embodiments, the sensor may detect the response of at least one human body part of the user to the multi-dimensional sexual stimulation operation and automatically generate the second feedback signal.

In some embodiments, during the operation of the sexual stimulation apparatus, the user may input the third feedback signal to adjust at least one parameter of the control signals.

In some embodiments, the user may manually input the third feedback signal on a touch panel of the sexual stimulation apparatus and/or the video play device for self-adjusting at least one control signal to better suit individual differences. For example, because individual circumstances or preferences vary from user to user, the user may personalize the sexual stimulation parameters in the axial direction for at least one human body part. For example, the user may provide the third feedback signal to increase or decrease the speed of movement of the male sexual stimulation apparatus, and the male sexual stimulation apparatus or other apparatus used to generate the control signal may adjust the corresponding parameters of the control signal according to the third feedback signal to correspondingly increase or decrease the speed of movement of the male sexual stimulation apparatus. In addition, the third feedback signal may also be configured to adjust a playing operation of the video segment on the video play device, for example, the fast forward of the video segment, the backward of the video segment, the pause of the video segment, the volume level of the video segment, the picture brightness of the video segment, etc.

In some embodiments, the sexual stimulation apparatus and/or the video play device may include a touch panel for user interaction to receive the third feedback signal manually entered by the user.

At block S1313: adding auxiliary control signals; wherein the auxiliary control signals are not based on parsing of the video segment.

In some embodiments, it may be possible that the parsed video segment does not generate the corresponding control signals within a certain time period, then the auxiliary control signals may be added to avoid the boredom of the user waiting. In other embodiments, on the basis of generating the control signals according to the chronological sexual stimulation parameter set, some auxiliary control signals may be added to enhance the pleasure of the user's experience.

In some embodiments, the auxiliary control signals are random or pseudo-random control signals. In some embodiments, the auxiliary control signals may be random or pseudo-randomly generated control signals in a predetermined mode, which is not limited herein. The auxiliary control signals are not based on the sexual stimulation parameter set and is therefore not relevant to the parsing of the video segment.

In the present disclosure, the parsing the video segment, and generating a chronological sexual stimulation parameter set corresponding to the video segment may be centrally or decentrally performed by the cloud-based server, the video play device, or the sexual stimulation apparatus. After obtaining at least a part of the chronological sexual stimulation parameter set, the converting to generate control signals for controlling the sexual stimulation apparatus according to the chronological sexual stimulation parameter set may be centrally or decentrally performed by the cloud-based server, the video play device, or the sexual stimulation apparatus.

In some embodiments, the cloud server, the video play device, or the sexual stimulation apparatus may independently and centrally parse the video segment and generate the corresponding chronological sexual stimulation parameter set, and may also independently and centrally convert to generate the control signals for controlling the sexual stimulation apparatus based on the chronological sexual stimulation parameter set. For example, the cloud server may independently and centrally process the video segment to generate the chronological sexual stimulation parameter set, centrally convert to generate the control signals based on the chronological sexual stimulation parameter set, and send the control signals to the sexual stimulation apparatus, thereby causing the sexual stimulation apparatus to synchronize the execution of the multi-dimensional stimulation operation when the video segment is played by the video play device. Alternatively, the cloud server may independently and centrally process the video segment for generating the corresponding chronological sexual stimulation parameter set, and send the chronological sexual stimulation parameter set to the sexual stimulation apparatus. The sexual stimulation apparatus independently and centrally converts the control signals for controlling the sexual stimulation apparatus based on the chronological sexual stimulation parameter set to synchronously perform the multi-dimensional stimulation operation when the video segment is played by the video play device. Alternatively, the video play device independently and centrally parses the video segment and generates the corresponding chronological sexual stimulation parameter set, etc.

In some embodiments, the server, the video play device, or the sexual stimulation apparatus may decentrally parse the video segment and generate the corresponding chronological sexual stimulation parameter set; after obtaining at least a part of the chronological sexual stimulation parameter set, the cloud server, video play device, or sexual stimulation apparatus may decentrally convert to generate the control signals for controlling the sexual stimulation apparatus based on the chronological sexual stimulation parameter set. In the embodiments, data transfer between the cloud server, the video play device, or the sexual stimulation apparatus may be performed with a peer to server&peer (P2SP) technology, and the video segment may be decentrally parsed on the cloud server, and on multiple video play devices and/or multiple sexual stimulation apparatuses as user terminals to generate the chronological sexual stimulation parameter set. Similarly, after obtaining at least a part of the chronological sexual stimulation parameter set, the chronological sexual stimulation parameter set may also be decentrally converted on the cloud server, and on multiple video play devices and/or multiple sexual stimulation apparatuses as user terminals to generate the control signals.

Figure 8:
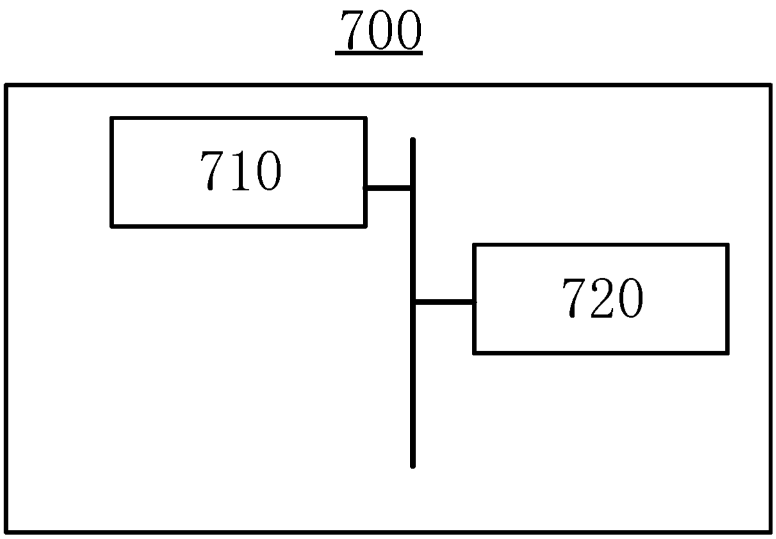
FIG. 8 is a schematic view of a sexual stimulation apparatus according to an embodiment of the present disclosure.

Referring to FIG. 8, FIG. 8 is a schematic view of a sexual stimulation apparatus 700 according to an embodiment of the present disclosure. The sexual stimulation apparatus 700 includes a communication module 710 configured to communicate with at least one of the video play device and/or the server, and to receive the chronological sexual stimulation parameter set or the control signals sent from the video play device or the server.

In some embodiments, the sexual stimulation apparatus 700 further includes a processor 720. The communication module 710 is communicatively coupled to the processor 720. The communication module 710 is in communication with the video play device and/or server to receive the chronological sexual stimulation parameter set or the control signals. The processor 720 is coupled to the communication module 710 for generating the control signals based on the chronological sexual stimulation parameter set and for controlling the sexual stimulation apparatus 700 to synchronously perform multi-dimensional stimulation operations based on the control signals when the video segment is played by the video play device. In some embodiments, the processor 720 is coupled to the communication module 710 for receiving the control signals and controlling the sexual stimulation apparatus 700 to synchronously perform the multi-dimensional stimulation operations based on the control signals when the video segment is played by the video play device.

Figure 9:
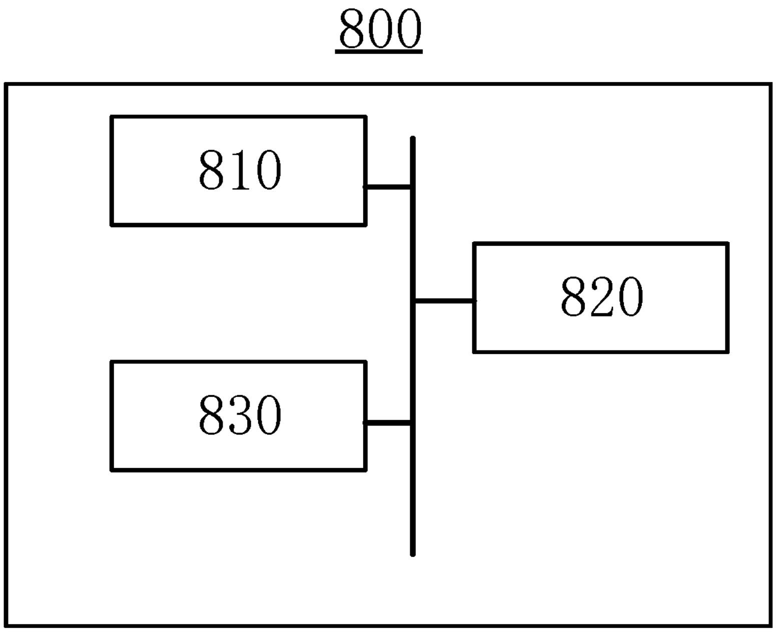
FIG. 9 is a schematic view of a sexual stimulation apparatus according to another embodiment of the present disclosure.

Referring to FIG. 9, FIG. 9 is a schematic view of a sexual stimulation apparatus 800 according to another embodiment of the present disclosure. The sexual stimulation apparatus 800 includes a communication module 810, a memory 820, and a processor 830.

In some embodiments, the communication module 810 is configured to communicate with the video play device and/or the server to receive the video segment; wherein the video segment includes the sexual stimulation scenario.

In some embodiments, the memory 820 is configured to store a program.

In some embodiments, the processor 830 is configured to call the program stored in the memory 820 and implement: parsing the video segment to generate a chronological sexual stimulation parameter set corresponding to the video segment, and generating control signals according to the chronological sexual stimulation parameter; and synchronously performing a multi-dimensional stimulation operation according to the control signals while the video segment is played on the video play device.

In some embodiments, the communication module 810, the memory 820, and the processor 830 are communicatively connected.

Figure 10:
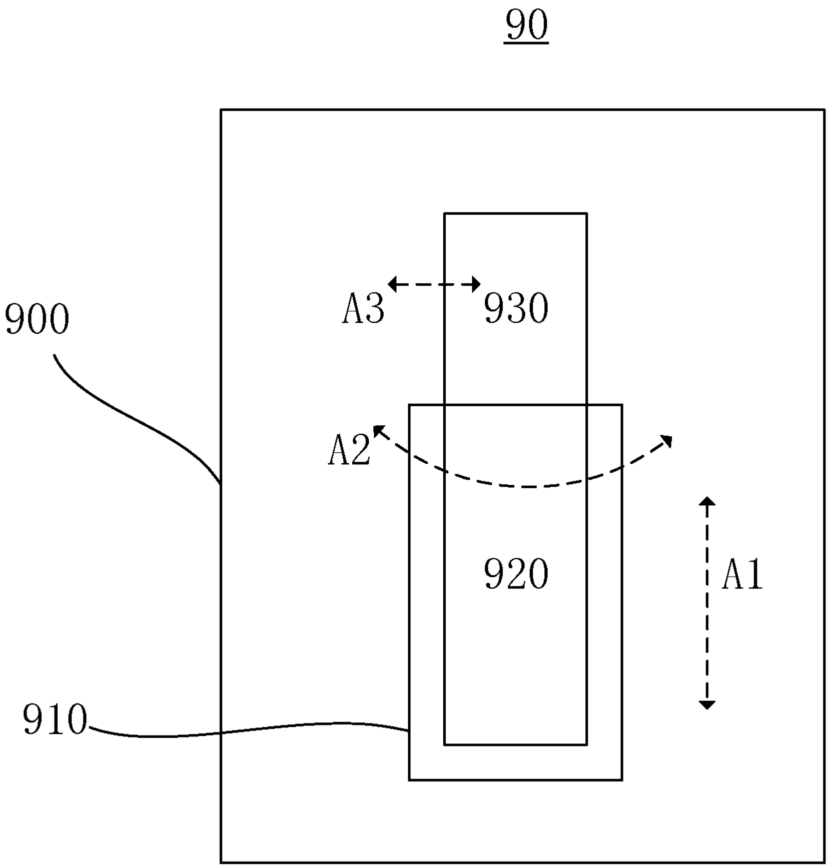
FIG. 10 is a schematic view of a multi-dimensional sexual stimulation apparatus according to an embodiment of the present disclosure.

Referring to FIG. 10, FIG. 10 is a schematic view of a multi-dimensional sexual stimulation apparatus according to an embodiment of the present disclosure.

As shown in FIG. 10, the sexual stimulation apparatus 90 includes a housing 900. In some embodiments, the sexual stimulation apparatus 90 is a male sexual stimulation apparatus. A first sexual stimulation component 910, a second sexual stimulation component 920, and a third sexual stimulation component 930 are each arranged within the housing 900. The second sexual stimulation component 920 and the third sexual stimulation component 930 define a continuous cavity. The user may insert the penis, etc. into the cavity. In some embodiments, the first sexual stimulation component 910 is looped outside the second sexual stimulation component 920 and may drive the second sexual stimulation component 920 and the third sexual stimulation component 930 together in a direction of arrow A1. The second sexual stimulation component 920 may be rotated in a direction of arrow A2 relative to the first sexual stimulation component 910. The third sexual stimulation component 930 may contract or expand along a direction of arrow A3.

In some embodiments, during an operation process of the sexual stimulation apparatus 90, the first sexual stimulation component 910 may drive the second sexual stimulation component 920, and the third sexual stimulation component 930 to move together along the direction of arrow A1, thereby changing a length of the penis of the user received in the cavity to perform an axial sexual stimulation on the penis of the user. The second sexual stimulation component 920 may rotate relative to the first sexual stimulation component 910 along the arrow A2 to perform a circumferential sexual stimulation on the penis of the user. The third sexual stimulation component 930 may contract or expand along the direction of arrow A3 to apply the sexual stimulation in the radial direction to the user's penis.

The first sexual stimulation component 910, the second sexual stimulation component 920, and the third sexual stimulation component 930 may be driven by separate drive components. With the sexual stimulation apparatus 90, the multi-dimensional stimulations in three directions (axial, radial, and circumferential) may be applied to the user, and each dimension of stimulation is independent and non-interfering with each other.

The above is only an implementation of the present disclosure, not to limit the scope of the patent of the present disclosure. Any equivalent structure or equivalent process transformation made by using the specification of the present disclosure and the accompanying drawings, or applied directly or indirectly in other related technical fields, are included in the scope of the present disclosure in the same way.

What is claimed is:

1. A sexual stimulation method, comprising:

obtaining a video segment, wherein the video segment comprises a sexual stimulation scenario;

an end-to-end convolutional neural network analyzing the video segment and generating a chronological sexual stimulation parameter set corresponding to the video segment independently and automatically; and playing, by a video play device, the video segment; and synchronously performing, by a sexual stimulation apparatus, a multi-dimensional stimulation operation according to the chronological sexual stimulation parameter set.

2. The method as claimed in claim 1, wherein the end-to-end convolutional neural network analyzing the video segment and generating the chronological sexual stimulation parameter set corresponding to the video segment independently and automatically, comprises:

parsing the video segment and generating the chronological sexual stimulation parameter set corresponding to the video segment by a video processing software.

3. The method as claimed in claim 2, wherein the sexual stimulation scenario comprises at least one of a sexual play scenario and a seductive scenario.

4. The method as claimed in claim 3, wherein the sexual stimulation scenario is the sexual play scenario, and the parsing the video segment and generating the chronological sexual stimulation parameter set corresponding to the video segment by a video processing software, comprise:

obtaining at least a part of an image sample, and/or bitstream and/or sound sample extracted from the video segment;

generating a first sexual feature set by processing at least a part of the image sample and/or the bitstream by an image processing network of the video processing software;

generating a second sexual feature set by processing at least a part of the sound sample by a sound processing network of the video processing software; and generating the chronological sexual stimulation parameter set based on the first sexual feature set and/or the second sexual feature set.

5. The method as claimed in claim 4, wherein the generating a first sexual feature set by analyzing at least a part of the image sample and/or the bitstream by the image processing network of the video processing software, comprises:

generating a first sexual feature subset by performing a single-frame analysis on the image sample according to a sequence of at least a part of frames of the image sample;

generating a second sexual feature subset by performing a multi-frame analysis on the image sample and/or the bitstream according to a sequence of at least a part of frames of the image sample and/or at least a part of the bitstream; and generating the first sexual feature set based on the first sexual feature subset and/or the second sexual feature subset.

6. The method as claimed in claim 5, wherein the generating a first sexual feature subset by performing a single-frame analysis on the image sample according to a sequence of at least a part of frames of the image sample, comprises:

determining whether a sexual play event occurs and/or a type of the sexual play event, wherein the first sexual feature subset comprises an occurrence identifier for a sexual play event and/or a type identifier for the sexual play event.

7. The method as claimed in claim 6, wherein the generating a second sexual feature subset by performing a multi-frame analysis on the image sample and/or the bitstream according to a sequence of at least a part of frames of the image sample and/or at least a part of the bitstream, comprises:

determining a speed of an action in the sexual play event, and/or a direction of the action in the sexual play event, and/or a position of at least one human body part at each sampling analysis time point during an action process in the sexual play event, and/or frequencies of a periodic action in the sexual play event, and/or frequency variations of the periodic action in the sexual play event, and/or a duration of the sexual play event, and/or an intensity-degree distribution of the sexual play event;

wherein the second sexual feature subset comprises: information for the speed of the action in the sexual play event, and/or information for the direction of the action in the sexual play event, and/or information for the position of the at least one human body part at each sampling analysis time point during the action process in the sexual play event, and/or information for the frequencies of the periodic action in the sexual play event, and/or information for the frequency variations of the periodic action in the sexual play event, and/or information for the duration of the sexual play event, and/or information for the intensity-degree distribution of the sexual play event.

8. The method as claimed in claim 7, wherein the generating a second sexual feature subset by performing a multi-frame analysis on the image sample and/or the bitstream according to a sequence of at least a part of frames of the image sample and/or at least a part of the bitstream, comprises:

performing a first-type multi-frame analysis on the at least a part of frames of the image sample and/or the at least a part of the bitstream during a first time period, and determining the speed of the action in the sexual play event, and/or the direction of the action in the sexual play event, and/or the position of the at least one human body part at each sampling analysis time point during the action process in the sexual play event; and/or performing a second-type multi-frame analysis on the at least a part of frames of the image sample and/or the at least a part of the bitstream during a second time period, and determining the frequencies of the periodic action in the sexual play event, the frequency variations of the periodic action in the sexual play event, and/or the duration of the sexual play event, and/or the intensity-degree distribution of the sexual play event;

wherein the second time period comprises a plurality of the first time periods.

9. The method as claimed in claim 8, wherein the generating a second sexual feature set by analyzing at least a part of the sound sample by a sound processing network of the video processing software, comprises:

analyzing a sound frequency, and/or a sound loudness, and/or a timbre, and/or a frequency domain distribution, and/or sound semantics, and/or a type of an action characterized by a sound, and/or an emotion-level characterized by the sound in the at least a part of the sound sample to assist in determining whether the sexual play event occurs, and/or the type of the sexual play event, and/or the speed of the action in the sexual play event, and/or the frequencies of the periodic action, and/or the frequency variations of the periodic action, and/or the duration of the sexual play event, and/or the intensity-degree of the sexual play event, and generating the second sexual feature set;

wherein the second sexual feature set comprises: an occurrence auxiliary identifier of the sexual play event, and/or a type auxiliary identifier of the sexual play event, and/or auxiliary information for the speed of the action in the sexual play event, and/or auxiliary information for the frequencies of the periodic action in the sexual play event, and/or auxiliary information for the frequency variations of the periodic action in the sexual play event, and/or auxiliary information for the duration of the sexual play event, and/or auxiliary information for the intensity-degree distribution of the sexual play event.

10. The method as claimed in claim 9, wherein the generating the chronological sexual stimulation parameter set based on the first sexual feature set and/or the second sexual feature set, comprises:

generating chronological sexual stimulation parameters matching with the video segment, and constructing the chronological sexual stimulation parameter set, according to the occurrence identifier for the sexual play event, and/or the type identifier for the sexual play event, and/or the information for the speed of the action in the sexual play event, and/or the information for the direction of the action in the sexual play event, and/or the information for the position of the at least one human body part at each sampling analysis time point during the action process in the sexual play event, and/or the information for the frequencies of the periodic action in the sexual play event, and/or the information for the frequency variations of the periodic action in the sexual play event, and/or the information for the duration of the sexual play event, and/or the information for the intensity-degree distribution of the sexual play event, in the first sexual features set; and/or the occurrence auxiliary identifier of the sexual play event, and/or the type auxiliary identifier of the sexual play event, and/or the auxiliary information for the speed of the action in the sexual play event, and/or the auxiliary information for the frequencies of the periodic action in the sexual play event, and/or the auxiliary information for the frequency variations of the periodic action in the sexual play event, and/or the auxiliary information for the duration of the sexual play event, and/or the auxiliary information for the intensity-degree distribution of the sexual play event, in the second sexual feature set.

11. The method as claimed in claim 1, wherein the chronological sexual stimulation parameter set comprises multi-dimensional sexual stimulation parameters.

12. The method as claimed in claim 11, wherein the multi-dimensional sexual stimulation parameters comprise at least two of:

a sexual stimulation parameter for a sexual stimulation generated along an axial direction for at least one human body part, a sexual stimulation parameter for a sexual stimulation generated along a radial direction for at least one human body part, and a sexual stimulation parameter for a sexual stimulation generated along a circumferential direction for at least one human body part.

13. The method as claimed in claim 11, wherein the multi-dimensional sexual stimulation parameters comprise:

a temperature sexual stimulation parameter for at least one human body part, and/or a humid sexual stimulation parameter for at least one human body part, and/or a lubricating sexual stimulation parameter for at least one human body part.

14. The method as claimed in claim 1, wherein the playing, by a video play device, the video segment and the synchronously performing, by a sexual stimulation apparatus, the multi-dimensional stimulation operation according to the chronological sexual stimulation parameter set, comprise:

converting to generate control signals for controlling the sexual stimulation apparatus according to the chronological sexual stimulation parameter set; and synchronously performing, by the sexual stimulation apparatus, the multi-dimensional stimulation operation according to the control signals.

15. The method as claimed in claim 14, wherein the converting to generate control signals for controlling the sexual stimulation apparatus according to the chronological sexual stimulation parameter set, comprises:

obtaining a type and/or a standard of the sexual stimulation apparatus; and converting to generate the control signals corresponding to the type and/or the standard of the sexual stimulation apparatus, according to the type and/or the standard of the sexual stimulation apparatus and the chronological sexual stimulation parameter set.

16. The method as claimed in claim 15, wherein the converting to generate the control signals corresponding to the type and/or the standard of the sexual stimulation apparatus, according to the type and/or the standard of the sexual stimulation apparatus and the chronological sexual stimulation parameter set, comprises:

receiving at least one feedback signal; and adjusting the control signals according to the at least one feedback signal;

wherein the at least one feedback signal comprises at least one of a first feedback signal, a second feedback signal, and a third feedback signal;

wherein the first feedback signal is generated in response to an operating mode of the sexual stimulation apparatus being selected; the second feedback signal is generated automatically according to a response of at least one human body part for the multi-dimensional stimulation operation, and the response is detected by a sensor of the sexual stimulation apparatus; the third feedback signal is generated in response to a user input.

17. The method as claimed in claim 15, wherein the converting to generate the control signals corresponding to the type and/or the standard of the sexual stimulation apparatus, according to the type and/or the standard of the sexual stimulation apparatus and the chronological sexual stimulation parameter set, comprises:

adding auxiliary control signals;

wherein the auxiliary control signals are not based on parsing of the video segment.

18. The method as claimed in claim 14, wherein the converting to generate the control signals for controlling the sexual stimulation apparatus according to the chronological sexual stimulation parameter set, comprises:

obtaining a type and/or a standard of each of a plurality of sexual stimulation apparatuses;

converting to generate a plurality of groups of control signals according to the type and/or the standard of each of the sexual stimulation apparatuses and the chronological sexual stimulation parameter set, each of the groups of control signals is configured for matching with the type and/or the standard of a corresponding one of the sexual stimulation apparatuses respectively.

19. The method as claimed in claim 14, wherein the video segment is obtained from a locally stored video or an online video stream.

20. The method as claimed in claim 14, wherein, after obtaining at least a part of the chronological sexual stimulation parameter set, the converting to generate control signals for controlling the sexual stimulation apparatus according to the chronological sexual stimulation parameter set is performed centrally or decentrally at the video play device, and/or the sexual stimulation apparatus, and/or a server.

21. The method as claimed in claim 1, wherein, the end-to-end convolutional neural network analyzing the video segment and generating the chronological sexual stimulation parameter set corresponding to the video segment independently and automatically are performed centrally or decentrally at the video play device, and/or the sexual stimulation apparatus, and/or a server.

22. A sexual stimulation apparatus, comprising:

a communication module, configured to communicate with a video play device and/or a server, and to receive a chronological sexual stimulation parameter set or control signals sent from the video play device or the server;

wherein the video play device or the server comprises an end-to-end convolutional neural network, and the end-to-end convolutional neural network is configured to analyze a video segment comprising a sexual stimulation scenario and generate the chronological sexual stimulation parameter set independently and automatically, the control signals are generated based on the chronological sexual stimulation parameter set; while the video play device plays the video segment, the sexual stimulation apparatus synchronously performs a multi-dimensional stimulation operation according to the control signals.

23. A sexual stimulation apparatus, comprising:

a communication module, configured to communicate with a video play device and/or a server to receive a video segment; wherein the video segment comprises a sexual stimulation scenario;

a memory, configured to store a program; and a processor, configured to call the program stored in the memory and implement:

enabling an end-to-end convolutional neural network to analyze the video segment and generate a chronological sexual stimulation parameter set corresponding to the video segment independently and automatically, and generating control signals according to the chronological sexual stimulation parameter set; and synchronously performing a multi-dimensional stimulation operation according to the control signals while the video segment is played on the video play device.

* * * * *